United States Patent Office 3,153,644
Patented Oct. 20, 1964

3,153,644
16α,17α - (2 - HALO - 1 - DI - LOWER - ALKYL-AMINO - 2 - HALOALKYLIDENEDIOXY) - STEROIDS AND PROCESS FOR THE PREPARATION THEREOF
Donald E. Ayer, Portage Township, Kalamazoo County, Mich., assignor to The Upjohn Company, Kalamazoo, Mich., a corporation of Delaware
No Drawing. Filed July 31, 1962, Ser. No. 213,611
20 Claims. (Cl. 260—239.55)

This invention relates to a novel class of steroids, namely, orthoamides. It is particularly concerned with 16α,17α-(2-halo-1-di-lower - alkylamino-2-haloalkylidenedioxy)-4-pregnene-3,20-dione and the 11β-hydroxy, 11-keto, 6α-fluoro, 6α-chloro, 6α-methyl, 9α-fluoro, 1-dehydro, 6-dehydro, 1,6-bisdehydro derivatives thereof substituted individually or in combination and corresponding otherwise thereto, and all of the foregoing compounds having instead of a 1-di-lower-alkylamino group, a corresponding substituent wherein the aforesaid group is replaced by the residue of a heterocyclic radical containing from 5 to 7 ring atoms, inclusive.

The novel compounds and process of this invention are illustratively represented by the following sequence of formulae:

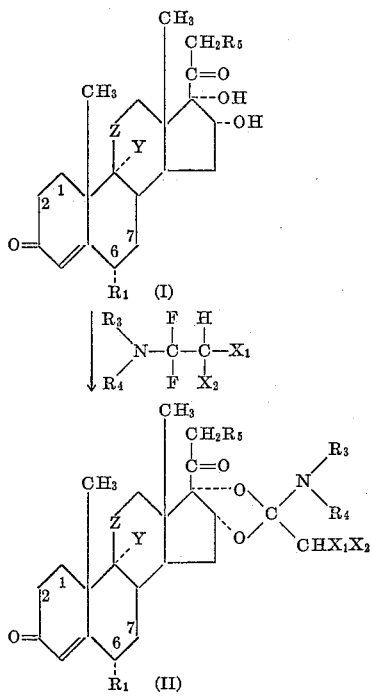

wherein the 1,2- and 6,7-carbon linkages are selected from the group consisting of single bonds and double bonds; $R_1$ is selected from the group consisting of hydrogen, methyl, chlorine and fluorine; $R_3$ and $R_4$ taken individually represent lower-alkyl and $R_3$ and $R_4$ taken together with the attached nitrogen atom represent the residue of a heterocyclic radical containing from five to seven ring atoms, inclusive; $R_5$ is selected from the group consisting of hydrogen, hydroxy and the lower-acyloxy radical of a hydrocarbon carboxylic acid containing from 1 to 12 carbon atoms, inclusive; $X_1$ is selected from the group consisting of chlorine and fluorine; $X_2$ is selected from the group consisting of chlorine, fluorine and trifluoromethyl; Z is selected from the group consisting of the methylene radical ($>CH_2$), the β-hydroxymethylene radical

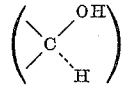

and the carbonyl radical ($>C=O$); Y is hydrogen, and when Z is selected from the group consisting of the β-hydroxymethylene and carbonyl radicals, Y is selected from the group consisting of hydrogen and fluorine; Y and Z taken together is selected from the group consisting of hydrogen and a double bond at the 9(11)-position.

The term "lower-alkyl" means an alkyl radical containing from 1 to 8 carbon atoms, inclusive, such as methyl, ethyl, propyl, butyl, amyl, hexyl, heptyl, octyl, and isomeric forms thereof. The term "heterocyclic radical containing from 5 to 7 ring atoms, inclusive" is inclusive of pyrrolidino, 2-methylpyrrolidino, 2,2-dimethylpyrrolidino, and like alkylpyrrolidino groups, 4-methylpiperazino, 2,4-dimethylpiperazino, and like alkylpiperazino groups, morpholino, piperidino, 2-methylpiperidino, 3-methylpiperidino, and like alkylpiperidino groups, hexamethyleneimino, homomorpholino, and the like.

The novel products of this invention embraced by Formula II, above, are obtained by the process which comprises reacting a 16α,17α-dihydroxysteroid represented by Formula I, above, in an appropriate solvent with from about 1.1 to about 10 mole-equivalents of a reagent of the Formula A

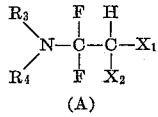

wherein $R_3$, $R_4$, $X_1$ and $X_2$ have the same meanings as above.

Examples of reagents having the formula (A) are N - (2 - chloro - 1,1,2 - trifluoroethyl)diethylamine, N-(1,1,2,2-tetrafluoroethyl)diethylamine, N-(2-chloro-1,1,2-trifluoroethyl)dimethylamine, N-(2-chloro-1,1,2-trifluoroethyl)dipropylamine, N-(2-chloro-1,1,2-trifluoroethyl)diisobutylamine, N-(2-chloro - 1,1,2 - trifluoroethyl)dioctylamine, N-(2-chloro - 1,1,2 - trifluoroethyl)methylethylamine, N-(2,2-dichloro - 1,1 - difluoroethyl)diethylamine, N-(1,1,2,3,3,3-hexafluoropropyl)diethylamine, N-(1,1,2,2-tetrafluoroethyl)diisopropylamine, and the like.

The method of producing the reagent N-(2-chloro-1,1,2-trifluoroethyl)diethylamine of the Formula A–1

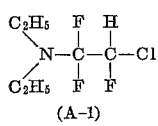

is described fully in Preparation 1, below. This reagent (A–1) is used to prepare compounds of Formula II wherein $R_3=R_4=$ethyl; $X_1=$chlorine and $X_2=$fluorine. To prepare compounds of Formula II wherein $R_3=R_4=$ethyl; $X_1=X_2=$chlorine, the reagent of the Formula A–2

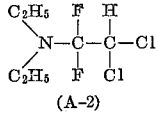

is employed; or instead, N,N-diethyltrichlorovinylamine of the Formula A-3

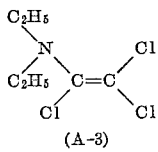

(A-3)

can be used.

The term "appropriate solvent" means any organic solvent which does not react with the reagent (A) and in which the steroid starting material is appreciably soluble such as aromatic and aliphatic hydrocarbons, halogenated hydrocarbons, esters, ketones, ethers and tertiary alcohols. Examples of such solvents are benzene, toluene, chlorobenzene, pentane, hexane, cyclohexane, ethyl acetate, butyl acetate, acetone, methyl ethyl ketone, tetrahydrofuran, ethyl ether, t-butyl alcohol, t-amyl alcohol, and the like. Since the starting materials are frequently only slightly soluble in non-polar solvents, a polar solvent such as tetrahydrofuran is preferred. However, the reaction Formula I→Formula II occurs when a suspension of the starting material in a non-polar solvent such as methylene chloride or benzene is employed.

The reaction (I→II) is completed in a period of time varying from between about one and about twenty-four hours; the time required is dependent on the reaction temperature, which can range from between about 0° C. to the boiling point of the solvent employed. Excess reagent (A) is destroyed by the addition of water or other hydroxylic solvent and the product (II) is isolated by conventional means. Additional purification of the product can be accomplished by usual methods, e.g., gradient elution chromatography from an adsorbent column with a suitable mixture of solvents, such as methylene chloride-Skellysolve B (hexanes), acetone-Skellysolve B, and the like.

Advantageously, but not necessarily, the process of (I→II) of the invention is carried out in the presence of an acid catalyst. The acid catalysts which are employed for this purpose are proton-forming acids such as the hydrogen halides, phosphoric acid, sulfuric acid, and the like or Lewis acids (see Fieser and Fieser, "Organic Chemistry," third edition, page 138, Reinhold, 1956), such as boron trifluoride, boron trichloride, aluminum trifluoride, arsenic trifluoride, phosphorus pentafluoride, titanium tetrafluoride, and the like. The preferred acids are the hydrogen halides, particularly hydrogen fluoride. In the case of hydrogen fluoride, the acid can be added to the reaction mixture or can be generated in situ, for example, by addition of the requisite quantity of water or an aliphatic alcohol such as methanol, ethanol, and the like, to produce the desired quantity of hydrogen fluoride by reaction with the reagent (A) as follows:

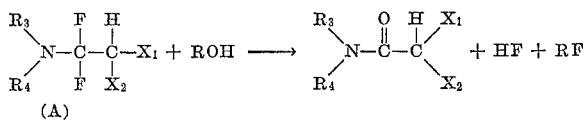

wherein $R_3$, $R_4$, $X_1$, and $X_2$ have the significance hereinbefore described and R represents hydrogen or loweralkyl.

In general the acid catalyst is added to the reaction mixture in catalytic quantities only, i.e., of the order of about 0.1 to about 25 percent of the starting dihydroxysteroid on a mole equivalent basis. Usually sufficient water is present initially in the reaction mixture to generate catalytic amounts of hydrogen fluoride.

The 16α, 17α - (2 - halo - 1 - di - lower - alkylamino - 2 - haloalkylidenedioxy) derivatives (II) of this invention, obtained from biologically active corresponding 16α, 17α-dihydroxysteroids (I), exhibit altered pharmacodynamic effects as compared to the parent compounds. The compounds embraced by Formula II possess anti-inflammatory and progestational properties of improved therapeutic ratio. Their anti-inflammatory activity renders them useful in the treatment of congestive heart failure, allergic reactions, rheumatoid arthritis, and related illnesses in valuable domestic animals. Inasmuch as the compounds represented by Formula II are highly potent progestational agents, active both orally and parenterally, they are useful by themselves, or, if desired, in combination with androgens (e.g., 17-methyltestosterone) and estrogens( e.g., diethylstilbesterol and ethinylestradiol) in the treatment of valuable domestic animals to control such conditions as functional uterine bleeding and dysmenorrhea; also in the maintenance of pregnancy and the regulation of fertility.

The compounds of the present invention can be prepared and administered to mammals, birds and animals in a wide variety of oral and parenteral dosage forms, simply or in admixture with other co-acting compounds. They can be associated with a carrier which can be a solid material or a liquid in which the compound is dissolved, dispersed or suspended. They also can be used in the form of ointments, lotions, creams, jellies, and drops suitable for the treatment of inflamed skin areas, eyes, ears, or nose irritations. The solid compositions can take the form of tablets, powders, capsules or the like, preferably in unit dosage forms for simple administration of precise dosages. Liquid compositions can be prepared of these compounds taking the form of solutions, emulsions, suspensions or elixirs and injectables, particularly intra-articular injectables.

PREPARATION 1

*N-(2-Chloro-1,1,2-Trifluoroethyl)diethylamine(A)*

A total of 15 ml. of trifluorochloroethylene was condensed in a pressure tube cooled in an acetone-Dry Ice (solid carbon dioxide) bath. To the pressure tube was added 10.3 ml. of diethylamine previously cooled to −40° C. and the tube was then sealed, placed in an ice bath and allowed to warm slowly to room temperature. The tube and contents were then allowed to stand for a period of about 48 hours at room temperature before cooling the tube, opening the latter and distilling the contents under reduced pressure with minimum exposure to atmospheric moisture. There was thus obtained 15.7 g. (85% yield) of N-(2-chloro-1,1,2-trifluoroethyl)diethylamine (A) in the form of a liquid having a boiling point of 33 to 34° C. at a pressure of 6 mm. of mercury.

Using the above procedure, but replacing diethylamine by dimethylamine, diisopropylamine, dibutylamine, pyrrolidine, 2-methylpyrrolidine, 2,2-dimethylpyrrolidine, 4-methylpiperazine, morpholine, piperidine, or 2-methylpiperidine, there are obtained the following reagents of Formula A:

N-(2-chloro-1,1,2-trifluoroethyl)dimethylamine,
N-(2-chloro-1,1,2-trifluoroethyl)-diisopropylamine,
N-(2-chloro-1,1,2-trifluoroethyl)dibutylamine,
N-(2-chloro-1,1,2-trifluoroethyl)pyrrolidine,
N-(2-chloro-1,1,2-trifluoroethyl)-2-methylpyrrolidine,
N-(2-chloro-1,1,2-trifluoroethyl)-2',2'-dimethylpyrrolidine,
N-(2-chloro-1,1,2-trifluoroethyl)-4'-methylpiperazine,
N-(2-chloro-1,1,2-trifluoroethyl)-morpholine,
N-(2-chloro-1,1,2-trifluoroethyl)piperidine,
and N-(2-chloro-1,1,2-trifluoroethyl)-2'-methylpiperidine, respectively.

Similarly, using the procedure of Preparation 1, but replacing trifluorochloroethylene by 2,2-dichloro-1,1-difluoroethylene there is obtained N-(2,2-dichloro-1,1-difluoroethyl)-diethylamine (A).

Similarly, using the procedure of Preparation 1, but replacing trifluorochloroethylene by perfluoropropene there is obtained N-(1,1,2,3,3,3-hexafluoropropyl)-diethylamine (A).

EXAMPLE 1

16α,17α-(2-Chloro-1-Diethylamino-2-Fluoroethylidenedioxy)-6α-Methyl-4-Pregnene-3,20-Dione (II)

One ml. of N - (2-chloro-1,1,2-trifluoroethyl-diethylamine (A) (produced in the manner disclosed in Preparation 1) was added to a suspension of 0.6 g. of 16α,17α-dihydroxy-6α-methyl-4-pregnene-3,20-dione (I) (prepared in the manner set forth in British Patent 864,762) in 20 ml. of tetrahydrofuran containing 0.02 ml. of methanol. The mixture was stirred for a period of about 3 hours at about 25° C. to give a pale yellow solution which was allowed to stand for about 16 hours at the same temperature. A solution of 1 g. of sodium bicarbonate in 20 ml. of water was added to the reaction mixture, its volume reduced to half by evaporation and extracted with methylene chloride. The extract was dried and then chromatographed on 100 g. of Florisil (synthetic magnesium silicate) by gradient elution with 2 l. each of Skellysolve B (hexanes) and 40% acetone-Skellysolve B. The product obtained was 0.85 g. of an oil (eluted with 12 to 16% of acetone); crystallizations from Skellysolve B and aqueous acetone gave 0.42 g. of 16α,17α-(2-chloro-1 - diethylamino - 2 - fluoroethylidenedioxy)6α-methyl-4-pregnene-3,20-dione (II) with a melting point of 163 to 165° C.

*Analysis.*—Calcd. for $C_{28}H_{41}ClFNO$: C, 65.93; H, 8.10; Cl. 6.95; F, 3.72; N, 2.75. Found: C, 66,28; H, 8.90; Cl, 7.12; F, 3.59; N, 2.85.

Following the procedure of Example 1 but substituting for N-(2-chloro-1,1,2-trifluoroethyl)diethylamine (A) another reagent represented by Formula A and produced in the manner disclosed in Preparation 1, yields the corresponding 16α,17α-(2-halo-1-di-lower-alkylamino (or residue of a heterocyclic radical with attached nitrogen atom containing from 5 to 7 ring atoms, inclusive)-2-haloalkylidenedioxy) derivative of 16α,17α - dihydroxy-6α-methyl-4-pregnene-3,20-dione (II).

EXAMPLE 2

16α,17α - (2-Chloro-1-Diethylamino-2-Fluoroethylidenedioxy) - 9α-Fluoro-11β,21-Dihydroxy-1,4-Pregnadiene-3,20-Dione 21-Acetate (II)

A suspension of 0.45 g. of 9α-fluoro-11β,16α,17α,21-tetrahydroxy - 1,4-pregnadiene-3,20-dione 21-acetate (I) [prepared in the manner disclosed in J. Am. Chem. Soc. 78, 5693 (1956)] in 200 ml. of methylene chloride containing 2 ml. of N-(2-chloro-1,1,2-trifluoroethyl)diethylamine (A) was stirred for a period of about 16 hours at a temperature of about 25° C. Ice water was added to the reaction mixture, stirring continued for about a half hour, the organic layer washed with saturated sodium bicarbonate solution and evaporated on a steam bath under a stream of nitrogen. The oily residue was chromatographed on 100 g. of Florisil. Elution with 15% acetone-Skellysolve B and analysis of the fractions by thin layer chromatography (silica gel; 1:1 cyclohexane-ethylacetate) revealed partial separation of two components (A) and (B) present in a ratio of about 2:3. Crystallization of the less polar material from acetone-Skellysolve B gave 5 mgs. of isomer A of 16α,17α-(2-chloro-1-diethylamino - 2 - fluoroethylidenedioxy)-9α-fluoro-11β,21-dihydroxy - 1,4-pregnadiene-3,20-dione 21-acetate (II). Crystallization of isomer B from the same solvents yielded 80 mg. of granular crystals of 16α,17α-(2-chloro-1 - diethylamino - 2-fluoroethylidenedioxy)9α-fluoro-11β, 21-dihydroxy-1,4-pregnadiene-3,20-dione 21-acetate (II) with a melting point of 162 to 188° C. (with decomposition) and infrared absorption $\nu_{max.}^{Nujol}$ at 3400, 1750, 1737, 1662, 1619, and 1605 cm.$^{-1}$

*Analysis.* — Calcd. for $C_{29}H_{38}ClF_2NO_7$: N, 2.39. Found: N, 2.33.

Following the procedure of Example 2 but employing as starting material instead of 9α-fluoro-11β,16α,17α,21-tetrahydroxy-1,4-pregnadiene-3,20-dione 21-acetate (I), another 21-acylate of the aforesaid compound (I), wherein the acyl radical is that of a hydrocarbon carboxylic acid containing from 1 to 12 carbon atoms, inclusive, yields the corresponding 16α·17α - (2-chloro-1-diethylamino - 2 - fluoroethylidenedioxy)9α-fluoro-11β,21-dihydroxy-1,4-pregnadiene-3,20-dione 21-acylate (II).

Following the procedure of Example 2 but substituting for N-(2-chloro-1,1,2-trifluoroethyl)diethylamine (A) another reagent represented by Formula A and produced in the manner disclosed in Preparation 1, yields the corresponding 16α,17α - (2-halo-1-di-lower-alkylamino [or residue of a heterocyclic radical with attached nitrogen atom containing from 5 to 7 ring atoms, inclusive]-2-haloalkylidenedioxy) derivative of 9α-fluoro-11β,16α,17α, 21 - tetrahydroxy - 1,4-pregnadiene-3,20-dione 21-acylate (II).

EXAMPLE 3

16α,17α - (1-Diethylamino-2,2-Dichloroethylidenedioxy) 9α - Fluoro - 11β,21 - Dihydroxy-1,4-Pregnadiene-3,20-Dione 21-Acetate (II)

A. A suspension of 0.2 g. of 9α-fluoro-11β,16α,17α,21-tetrahydroxy-1,4-pregnadiene-3,20-dione 21-acetate (I) in 100 ml. of methylene chloride containing 1 ml. of N, N-diethyltrichlorovinylamine (A–3) [prepared in the manner disclosed in J. Am. Chem. Soc. 82, 909 (1960)] was stirred for about 16 hours at a temperature of about 25° C. Ice water was added to the reaction mixture, stirring coninued for about a half hour, the organic layer washed with saturated sodium bicarbonate solution and evaporated on a steam bath under a stream of nitrogen. The residue was chromatographed on 100 g. of Florisil. Elution with 15% acetone-Skellysolve B in accordance with the procedures of Example 2 gave a mixture of two closely related isomers. Fractional crystallization from aqueous acetone and acetone-Skellysolve B gave 40 mg. of one isomer of 16α,17α-(1-diethylamino-2,2-dichloroethylidenedioxy)9α - fluoro-11β,21-dihydroxy-1,4-pregnadiene-3,20-dione 21-acetate (II) with a melting point of 170 to 177° C. (decomposition) and infrared absorption $\nu_{max.}^{Nujol}$ at 3465, 1747, 1737, 1661, 1620 and 1605 cm.$^{-1}$

*Analysis.*—Calcd. for $C_{29}H_{38}Cl_2FNO_7$: Cl. 11.77; N, 2.32. Found: Cl, 11.62; N, 2.30.

B. A suspension of 0.45 g. of 9α-fluoro-11β,16α,17α, 21 - tetrahydroxy-1,4-pregnadiene-3,20-dione, 21-acetate (I) in 200 ml. of methylene chloride containing 2 ml. of N-(2,2-dichloro-1,1-difluoroethyl)diethylamine (A–2) is stirred for 16 hours at a temperature of about 25° C. The reaction is worked up as described in part A, above, to give 16α,17α-(1-diethylamino-2,2-dichloroethylidenedioxy) - 9α - fluoro-11β,21-dihydroxy-1,4-pregnadiene-3, 20-dione 21-acetate (II).

Following the procedure of Example 3 but employing as starting material instead of 9α-fluoro-11β,16α,17α,21-tetrahydroxy-1,4-pregnadiene-3,20-dione 21-acetate (II), another 21-acylate of the aforesaid compound (I), wherein the acyl radical is that of a hydrocarbon carboxylic acid containing from 1 to 12 carbon atoms, inclusive, yields the corresponding 16α,17α-(1-diethylamino-2,2-dichloroethylidenedioxy) - 9α-fluoro-11β,21-dihydroxy-1,4-pregnadiene-3,20-dione 21-acylate (II).

EXAMPLE 4

16α,17α - (2 - Chloro-1-Diethylamino-2-Fluoroethylidenedioxy) - 9α-Fluoro-11β,21-Dihydroxy-1,4-Pregnadiene-3,20-Dione (II)

A solution of 0.5 g. of 9α-fluoro-11β,16α,17α,21-tetrahydroxy-1,4-pregnadiene-3,20-dione (I) [prepared in the manner disclosed in J. Am. Chem. Soc. 78, 5693 (1956)] in 25 ml. of tetrahydrofuran containing 0.02 ml. of methanol and 1.5 ml. of N-(2-chloro-1,1,2-trifluoroethyl)diethylamine (A) was allowed to stand for a period of about 16 hours at a temperature of about 25° C. Twenty-five ml. of saturated sodium bicarbonate solution was added and the mixture evaporated at reduced pressure to a volume of about 25 ml. to yield a precipitate. The precipitate was dissolved in methylene chloride and the resulting solution washed with sodium chloride solution, dried over magnesium sulfate and evaporated to give a red oil that was chromatographed twice on a column of Florisil by gradient elution. Fractions eluted with 20 to 25% acetone-Skellysolve B were crystallized from the same solvent pair to give 75 mg. of 16α,17α-(2-chloro - 1 - diethylamino - 2 - fluoroethylidenedioxy)-9α-fluoro-11β,21-dihydroxy-1,4-pregnadiene-3,20-dione (II), with a melting point of 174 to 176° C.

Acetylation of the above product (II) by reaction with 0.4 ml. of pyridine and 0.8 ml. of acetic anhydride at a temperature of about 25° C. for about 16 hours gave an oil indistinguishable (by thin layer chromatography) from the 16α,17α-(2-chloro-1-diethylamino-2-fluoroethylidenedioxy)9α - fluoro-11β,21-dihydroxy-1,4-pregnadiene-3,20-dione 21-acetate (II), prepared as in Example 2.

Following the procedure of Example 4 but substituting for N-(2-chloro-1,1,2-trifluoroethyl)diethylamine (A) another reagent represented by Formula A and produced in the manner disclosed in Preparation 1, yields the corresponding 16α,17α - (2-halo-1-di-lower-alkylamino [or residue of a heterocyclic radical with attached nitrogen atom containing from 5 to 7 ring atoms, inclusive]-2-haloalkylidenedioxy) derivative of 9α-fluoro-11β,16α,17α, 21-tetrahydroxy-1,4-pregnadiene-3,20-dione (II).

EXAMPLE 5

In this example certain of the new compounds of this invention are prepared by the novel process therefor, which is illustratively represented by the following reaction sequence:

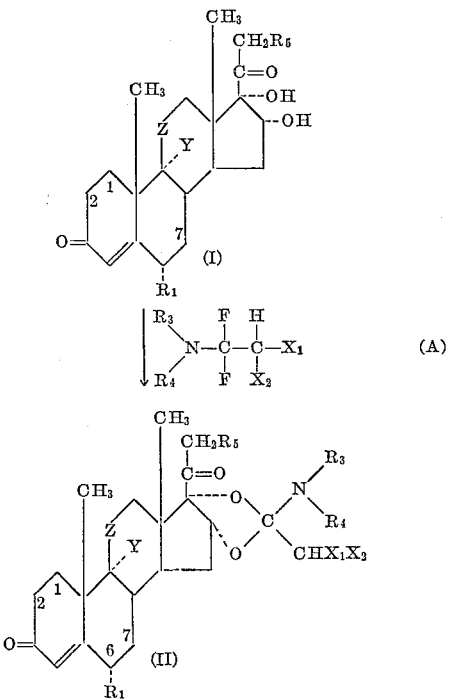

wherein $R_1$, $R_3$, $R_4$, $R_5$, $X_1$, $X_2$, Y, Z, 1, 2 and 6, 7 have the same meanings as those indicated therefor following the flow sheet appearing in column 1.

Following the procedures of Examples 1, 2 and 4 but substituting for the starting materials disclosed therein the following:

(1) 16α,17α-dihydroxy-4-pregnene-3,20-dione (I) [prepared as in Ber. 87, 593 (1954)], (2) 11β,16α,17α,21-tetrahydroxy-4-pregnene-3,20-dione (I) (prepared as in U.S. Patent 2,777,864), (3) 16α,17α,21-trihydroxy-4-pregnene-3,11,20-trione (I) (prepared as in U.S. Patent 2,77,864), (4) 11β,16α,17α,21-tetrahydroxy-1,4-pregnadiene-3,20-dione (I) (prepared as in U.S. Patent 2,806,043), (5) 16α,17α,21-trihydroxy-1,4-pregnadiene-3,11,20-trione (I) (prepared as in U.S. Patent 2,806,043), (6) 6α-fluoro-11β,16α,17α,21-tetrahydroxy-4-pregnene-3,20-dione (I) (prepared as in Example 1 of U.S. Patent 2,838,546), (7) 6α-fluoro-16α,17α,21-trihydroxy-4-pregnene-3,11,20-trione (I) (prepared as in Example 4 of U.S. Patent 2,838,546), (8) 6α-fluoro-11β,16α,17α,21-tetrahydroxy-1,4-pregnadiene-3,20-dione (I) (prepared as in U.S. Patent 2,838,-546), (9) 6α-fluoro-16α,17α,21-trihydroxy-1,4-pregnadiene-3,11,20-trione (I) (prepared as in U.S. Patent 2,838,-546),

(10) 16α,17α,21-trihydroxy-4,9(11)-pregnadiene-3,20-dione 21-acetate (I) (prepared as in U.S. Patent 2,773,-080),

(11) 9α-fluoro-11β,16α,17α,21-tetrahydroxy-4-pregnene-3,20-dione (I),

(12) 9α-fluoro-16α,17α,21-trihydroxy-4-pregnene-3,11,20-trione (I),

(13) 9α-fluoro-11β,16α,17α,21-tetrahydroxy-1,4-pregnadiene-3,20-dione (I),

(14) 9α-fluoro-16α,17α,21-trihydroxy-1,4-pregnadiene-3,11,20-trione (I),

(15) 6α,9α-difluoro-11β,16α,17α,21-tetrahydroxy-4-pregnene-3,20-dione (I) (prepared as in French Patent 1,266,939),

(16) 6α,9α-difluoro-16α,17α,21-trihydroxy-4-pregnene-3,11,20-trione (I) (prepared in French Patent 1,266,-939 and U.S. Patent 2,838,548),

(17) 6α,9α-difluoro-11β,16α,17α,21-tetrahydroxy-1,4-pregnadiene-3,20-dione (I) (prepared as in U.S. Patent 2,838,546),

(18) 6α,9α-difluoro-16α,17α,21-trihydroxy-1,4-pregnadiene-3,11,20-trione (I) (prepared as in U.S. Patent 2,838,546),

(19) 6α,9α-difluoro-11β,16α,17α,21-tetrahydroxy-4,6-pregnadiene-3,20-dione (I),

(20) 6α,9α-difluoro-16α,17α,21-trihydroxy-4,6-pregnadiene-3,11,20-trione (I),

(21) 6α,9α-difluoro-11β,16α,17α,21-tetrahydroxy-1,4,6-pregnatriene-3,20-dione (I),

(22) 6α,9α-difluoro-16α,17α,21-trihydroxy-1,4,6-pregnatriene-3,11,20-trione (I),

(23) 6α-methyl-11β,16α,17α,21-tetrahydroxy-4-pregnene-3,20-dione (I),

(24) 6α-methyl-16α,17α,21-trihydroxy-4-pregnene-3,11,20-trione (I),

(25) 6α-methyl-11β,16α,17α,21-tetrahydroxy-1,4-pregnadiene-3,20-dione (I),

(26) 6α-methyl-16α,17α,21-trihydroxy-1,4-pregnadiene-3,11,20-trione (I),

(27) 11β,16α,17α-trihydroxy-4-pregnene-3,20-dione (I),

(28) 9α-fluoro-11β,16α,17α-trihydroxy-4-pregnene-3,20-dione (I),

(29) 6α-methyl-11β,16α,17α-trihydroxy-4-pregnene-3,20-dione (I),

(30) 9α-fluoro-6α-methyl-11β,16α,17α-trihydroxy-4-pregnene-3,20-dione (I),

(31) 6α-fluoro-11β,16α,17α-trihydroxy-4-pregnene-3,20-dione (I),

(32) 6α,9α-difluoro-11β,16α,17α-trihydroxy-4-pregnene-3,20-dione (I) and

(33) 16α,17α-dihydroxy-6α-fluoro-4-pregnene-3,20-dione (I), yield, respectively, (1) 16α,17α-(2-chloro-1-diethylamino-2-fluoroethylidenedioxy)-4-pregnene-3,20-dione (II), (2) 16α,17α-(2-chloro-1-diethylamino-2-fluoroethylidenedioxy)-11β,21-dihydroxy-4-pregnene-3,20-dione (II), (3) 16α,17α-(2-chloro-1-diethylamino-2-fluoroethyl-idenedioxy)-21-hydroxy-4-pregnene-3,11,20-trione (II),
(4) 16α,17α-(2-chloro-1-diethylamino-2-fluoroethyl-idenedioxy)-11β,21-dihydroxy-1,4-pregnadiene-13,20-dione (II),
(5) 16α,17α-(2-chloro-1-diethylamino-2-fluoroethyl-idenedioxy)-21-hydroxy-1,4-pregnadiene-3,11,20-trione (II),
(6) 16α,17α-(2-chloro-1-diethylamino-2-fluoroethyl-idenedioxy)-11β,21-dihydroxy-6α-fluoro-4-pregnene-3,20-dione (II),
(7) 16α,17α-(2-chloro-1-diethylamino-2-fluoroethylidene-dioxy)-21-hydroxy-6α-fluoro-4-pregnene-3,11,20-trione (II),
(8) 16α,17α-(2-chloro-1-diethylamino-2-fluoroethylidene-dioxy)-11β,21-dihydroxy-6α-fluoro-1,4-pregnadiene-3,20-dione (II),
(9) 16α,17α-(2-chloro-1-diethylamino-2-fluoroethylidene-dioxy)-21-hydroxy-6α-fluoro-1,4-pregnadiene-3,11,20-trione (II),
(10) 16α,17α-(2-chloro-1-diethylamino-2-fluoroethyli-denedioxy)-21-hydroxy-4,9(11)-pregnadiene-3,20-dione 21-acetate (II),
(11) 16α,17α-(2-chloro-1-diethylamino-2-fluoroethyli-denedioxy)-11β,21-dihydroxy-9α-fluoro-4-pregnene-3,20-dione (II),
(12) 16α,17α-(2-chloro-1-diethylamino-2-fluoroethyli-denedioxy)-21-hydroxy-9α-fluoro-4-pregnene-3,11,20-trione (II),
(13) 16α,17α-(2-chloro-1-diethylamino-2-fluoroethyli-denedioxy)-11β,21-dihydroxy-9α-fluoro-1,4-pregna-diene-3,20-dione (II),
(14) 16α,17α-(2-chloro-1-diethylamino-2-fluoroethyli-denedioxy)-21-hydroxy-9α-fluoro-1,4-pregnadiene-3,11,20-trione (II),
(15) 16α,17α-(2-chloro-1-diethylamino-2-fluoroethyli-denedioxy)-6α,9α-difluoro-11β,21-dihydroxy-4-preg-nene-3,20-dione (II),
(16) 16α,17α-(2-chloro-1-diethylamino-2-fluoroethyli-denedioxy)-6α,9α-difluoro-21-hydroxy-4-pregnene-3,11,20-trione (II),
(17) 16α,17α-(2-chloro-1-diethylamino-2-fluoroethyli-denedioxy)-6α,9α-difluoro-11β,21-dihydroxy-1,4-preg-nadiene-3,20-dione (II),
(18) 16α,17α-(2-chloro-1-diethylamino-2-fluoroethyli-denedioxy)-6α,9α-difluoro-21-hydroxy-1,4-pregnadiene-3,11,20-trione (II),
(19) 16α,17α-(2-chloro-1-diethylamino-2-fluoroethyli-denedioxy)-6α,9α-difluoro-11β,21-dihydroxy-4,6-pregnadiene-3,20-dione (II),
(20) 16α,17α-(2-chloro-1-diethylamino-2-fluoroethyli-denedioxy)-6α,9α-difluoro-21-hydroxy-4,6-pregna-diene-3,11,20-trione (II),
(21) 16α,17α-(2-chloro-1-diethylamino-2-fluoroethyli-denedioxy)-6α,9α-difluoro-11β,21-dihydroxy-1,4,6-pregnatriene-3,20-dione (II),
(22) 16α,17α-(2-chloro-1-diethylamino-2-fluoroethyli-denedioxy)-6α,9α-difluoro-21-hydroxy-1,4,6-preg-natriene-3,11,20-trione (II),
(23) 16α,17α-(2-chloro-1-diethylamino-2-fluoroethyli-denedioxy)-11β,21-dihydroxy-6α-methyl-4-pregnene-3,20-dione (II),
(24) 16α,17α-(2-chloro-1-diethylamino-2-fluoroethyli-denedioxy)-21-hydroxy-6α-methyl-4-pregnene-3,11,20-trione (II),
(25) 16α,17α-(2-chloro-1-diethylamino-2-fluoroethyli-denedioxy)-11β,21-dihydroxy-6α-methyl-1,4-preg-nadiene-3,20-dione (II),
(26) 16α,17α-(2-chloro-1-diethylamino-2-fluoroethyli-denedioxy)-21-hydroxy-6α-methyl-1,4-pregnadiene-3,11,20-trione (II),
(27) 16α,17α-(2-chloro-1-diethylamino-2-fluoroethyli-denedioxy)-11β-hydroxy-4-pregnene-3,20-dione (II),
(28) 16α,17α-(2-chloro-1-diethylamino-2-fluoroethyli-denedioxy)-9α-fluoro-11β-hydroxy-4-pregnene-3,20-dione (II),
(29) 16α,17α-(2-chloro-1-diethylamino-2-fluoroethyli-denedioxy)-11β-hydroxy-6α-methyl-4-pregnene-3,20-dione (II),
(30) 16α,17α-(2-chloro-1-diethylamino-2-fluoroethyli-denedioxy)-9α-fluoro-11β-hydroxy-6α-methyl-4-preg-nene-3,20-dione (II),
(31) 16α,17α-(2-chloro-1-diethylamino-2-fluoroethyli-denedioxy)-6α-fluoro-11β-hydroxy-4-pregnene-3,20-dione (II),
(32) 16α,17α-(2-chloro-1-diethylamino-2-fluoroethyli-denedioxy)-6α,9α-difluoro-11β-hydroxy-4-pregnene-3,20-dione (II), and
(33) 16α,17α-(2-chloro-1-diethylamino-2-fluoroethyli-denedioxy)-6α-fluoro-4-pregnene-3,20-dione (II).

Following the procedure of Example 5 but substituting for N-(2-chloro-1,1,2-trifluoroethyl)diethylamine (A) another reagent represented by Formula A and produced in the manner disclosed in Preparation 1, yields the corresponding 16α,17α-(2-halo-1-di-lower-alkylamine[or residue of a heterocyclic radical with attached nitrogen atom containing from 5 to 7 ring atoms, inclusive]-2-haloalkylidenedioxy) derivatives (II) of the compounds embraced by Formula I.

I claim:
1. Compounds of the formula

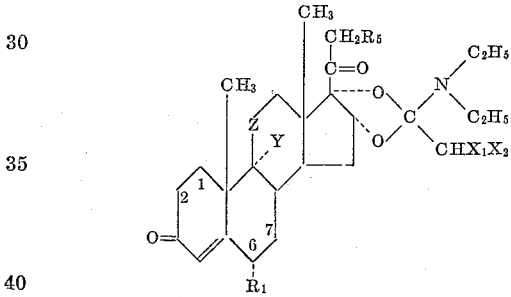

wherein the 1,2- and 6,7-carbon linkages are selected from the group consisting of single bonds and double bonds; $R_1$ is selected from the group consisting of hydrogen, methyl and fluorine; $R_5$ is selected from the group consisting of hydrogen, hydroxy and the lower-acyloxy radical of a hydrocarbon carboxylic acid containing from 1 to 12 carbon atoms, inclusive; $X_1$ is selected from the group consisting of chlorine and fluorine; $X_2$ is selected from the group consisting of chlorine, fluorine and trifluoromethyl; Z is selected from the group consisting of the methylene radical ($>CH_2$), the β-hydroxymethylene radical

and the carbonyl radical ($>C=O$); Y is hydrogen, and when Z is selected from the group consisting of the β-hydroxymethylene and carbonyl radicals, Y is selected from the group consisting of hydrogen and fluorine; Y and Z taken together is selected from the group consisting of hydrogen and a double bond at the 9(11)-position.

2. 16α,17α - (2 - chloro - 1 - diethylamino - 2 - fluoro-ethylidenedioxy)-6α-methyl-4-pregnene-3,20-dione.

3. 16α,17α - (2 - chloro - 1 - diethylamino - 2 - fluoro-ethylidenedioxy) - 9α - fluoro - 11β,21 - dihydroxy - 1,4-pregnadiene-3,20-dione 21-acetate.

4. 16α,17α-(1-diethylamino - 2,2 - dichloroethylenedi-oxy)-9α-fluoro-11β,21-dihydroxy-1,4 - pregnadiene - 3,20-dione 21-acetate.

5. 16α,17α - (2 - chloro - 1-diethylamino-2-fluoroethyl-idenedioxy)-9α-fluoro-11β,21 - dihydroxy - 1,4 - pregna-diene-3,20-dione.

6. A compound selected from the group consisting of 16a,17a-(2-chloro-1-diethylamino - 2 - fluoroethylidenedioxy)-6a-methyl-4-pregnene-3,20-dione and the corresponding 1-dehydro, 6-dehydro and 1,6-bisdehydro analogues thereof.

7. A compound selected from the group consiting of 16α,17α - (2-chloro - 1 - diethylamino-2-fluoroethylidenedioxy)-6a-fluoro-4-pregnene-3,20-dione and the corresponding 1-dehydro, 6-dehydro and 1,6-bisdehydro analogues thereof.

8. A compound selected from the group consisting of 16α,17α - (2 - chloro - 1-diethylamino-2-fluoroethylidenedioxy)-11β-hydroxy-4-pregnene-3,20-dione and the corresponding 1-dehydro, 6-dehydro and 1,6-bisdehydro analogues thereof.

9. A compound selected from the group consisting of 16a,17a - (2 - chloro-1-diethylamino-2-fluoroethylidenedioxy)-9α-fluoro-11β-hydroxy-4-pregnene-3,20-dione and the corresponding 1-dehydro, 6-dehydro and 1,6-bisdehydro analogues thereof.

10. A compound selected from the group consisting of 16a,17a - (2 - chloro-1-diethylamino-2-fluoroethylidenedioxy)-11β-hydroxy-6a-methyl-4-pregnene - 3,20 - dione and the corresponding 1-dehydro, 6-hydro and 1,6-bisdehydro analogues thereof.

11. A compound selected from the group consisting of 16a,17a - (2 - chloro-1-diethylamino-2-fluoroethylidenedioxy) - 9a - fluoro-11β-hydroxy-6a-methyl-4-pregnene-3,20-dione and the corresponding 1-dehydro, 6-dehydro and 1,6-bisdehydro analogues thereof.

12. A compound selected from the group consisting of 16a,17a - (2 - chloro-1-diethylamino-2-fluoroethylidenedioxy) - 6α - fluoro - 11β-hydroxy-4-pregnene-3,20-dione and the corresponding 1-dehydro, 6-dehydro and 1,6-bisdehydro analogues thereof.

13. A compound selected from the group consisting of 16a,17a - (2 - chloro-1-diethylamino-2-fluoroethylidenedioxy) - 6a,9a - difluoro-11β-hydroxy-4-pregnene-3,20-dione and the corresponding 1-dehydro, 6-dehydro and 1,6-bisdehydro analogues thereof.

14. A compound selected from the group consisting of 16a,17a - (2 - chloro-1-diethylamino-2-fluoroethylidenedioxy)-11β,21-dihydroxy - 4 - pregnene-3,20-dione and the 21-acylates thereof wherein the acyl radical is that of a hydrocarbon carboxylic acid containing from 1 to 12 carbon atoms, inclusive; the corresponding 1-dehydro, 6-dehydro and 1,6-bisdehydro analogues of the foregoing.

15. A compound selected from the group consisting of 16a,17a - (2 - chloro-1-diethylamino-2-fluoroethylidenedioxy)11β,21-dihydroxy-9a-fluoro-4-pregnene-3,20 - dione and the 21-actylates thereof wherein the acyl radical is that of a hydrocarbon carboxylic acid containing from 1 to 12 carbon atoms, inclusive; the corresponding 1-dehydro, 6-dehydro and 1,6-bisdehydro analogues of the foregoing.

16. A compound selected from the group consisting of 16a,17a - (2 - chloro-1-diethylamino-2-fluoroethylidenedioxy) - 11β,21 - dihydroxy-6a-methyl-4-pregnene - 3,20-dione and the 21-acylates thereof wherein the acyl radical is that of a hydrocarbon carboxylic acid containing from 1 to 12 carbon atoms, inclusive; the corresponding 1-dehydro, 6-dehydro and 1,6-bisdehydro analogues of the foregoing.

17. A compound selected from the group consisting of 16a,17a - (2 - chloro-1-diethylamino-2-fluoroethylidenedioxy) - 11β,21-dihydroxy-9a - fluoro-6a-methyl-4-pregnene-3,20-dione and the 21-acylates thereof wherein the acyl radical is that of a hydrocarbon carboxylic acid containing from 1 to 12 carbon atoms, inclusive; the corresponding 1-dehydro, 6-dehydro and 1,6-bisdehydro analogues of the foregoing.

18. A compound selected from the group consisting of 16a,17a - (2 - chloro-1-diethylamino-2-fluoroethylidenedioxy) - 11β,21 - dihydroxy-6a-fluoro - 4-pregnene - 3,20-dione and the 21-acylates thereof wherein the acyl radical is that of a hydrocarbon carboxylic acid containing from 1 to 12 carbon atoms, inclusive; the corresponding 1-dehydro, 6-dehydro and 1,6-bisdehydro analogues of the foregoing.

19. A compound selected from the group consisting of 16a,17a - (2 - chloro-1-diethylamino-2-fluoroethylidenedioxy) - 6a,9a - difluoro-11β,21-dihydroxy - 4 - pregnene-3,20-dione and the 21-acylates thereof wherein the acyl radical is that of a hydrocarbon carboxylic acid containing from 1 to 12 carbon atoms, inclusive; the corresponding 1-dehydro, 6-dehydro and 1,6-bisdehydro analogues of the foregoing.

20. A process for the production of a compound of the Formula II

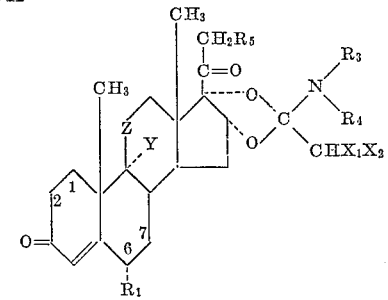

(II)

wherein the 1,2- and 6,7-carbon linkages are selected from the group consisting of single bonds and double bonds; $R_1$ is selected from the group consisting of hydrogen, methyl and fluorine; $R_3$ and $R_4$ taken individually represent lower-alkyl and $R_3$ and $R_4$ taken together with the attached nitrogen atom represent the residue of a heterocyclic radical containing from five to seven ring atoms, inclusive; $R_5$ is selected from the group consisting of hydrogen, hydroxy and the lower-acyloxy radical of a hydrocarbon carboxylic acid containing from 1 to 12 carbon atoms, inclusive; $X_1$ is selected from the group consisting of chlorine and fluorine; $X_2$ is selected from the group consisting of chlorine, fluorine and trifluoromethyl; Z is selected from the group consisting of the methylene radical ($>CH_2$), the β-hydroxymethylene radical

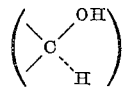

and the carbonyl radical ($>C=O$); Y is hydrogen, and when Z is selected from the group consisting of the β-hydroxymethylene and carbonyl radicals, Y is selected from the group consisting of hydrogen and fluorine; Y and Z taken together is selected from the group consisting of hydrogen and a double bond at the 9(11)-position, which comprises treating a corresponding compound of the Formula I

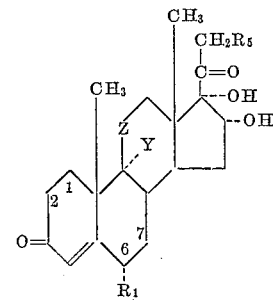

(I)

wherein $R_1$, $R_5$, Y, Z, 1, 2 and 6, 7 have the same meanings as above, with a reagent of the Formula A

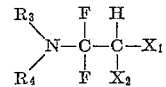

(A)

wherein $R_3$, $R_4$, $X_1$ and $X_2$ have the same meanings as above.

No references cited.